C. A. LATHAM.
ANTIFRICTION BEARING.
APPLICATION FILED AUG. 20, 1900.
999,806.
Patented Aug. 8, 1911.
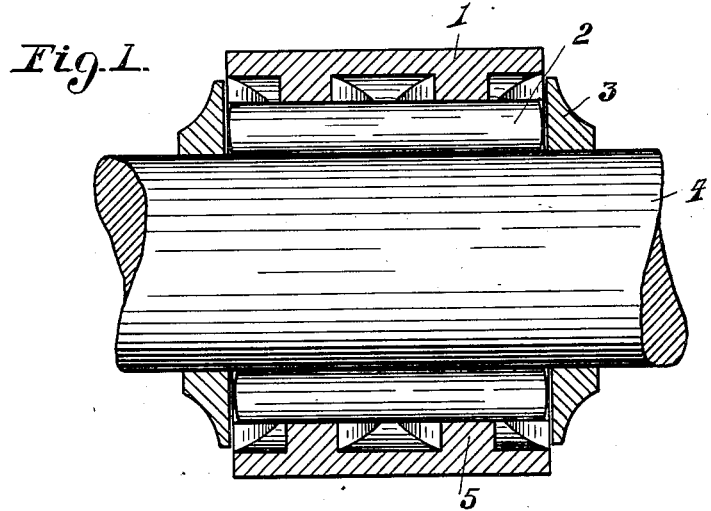
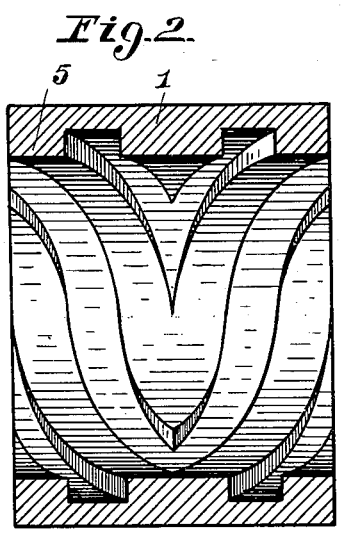
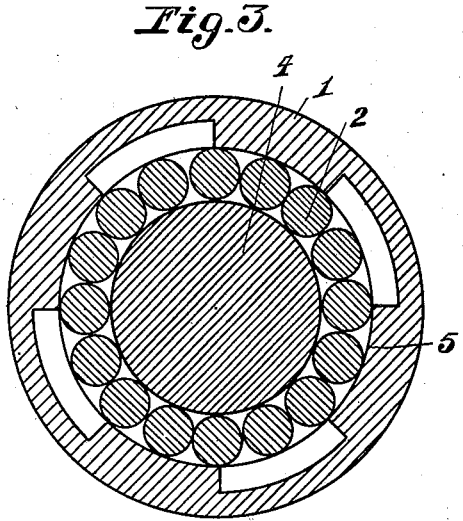
WITNESSES:
George J. Oltsch
Eva E. Alger
CHESTER A. LATHAM.
INVENTOR.
BY
ATTORNEY.

UNITED STATES PATENT OFFICE.

CHESTER A. LATHAM, OF WICHITA, KANSAS.

ANTIFRICTION-BEARING.

999,806.     Specification of Letters Patent.     Patented Aug. 8, 1911.

Application filed August 20, 1900. Serial No. 27,495.

*To all whom it may concern:*

Be it known that I, CHESTER A. LATHAM, a citizen of the United States, residing at Wichita, in the county of Sedgwick and State of Kansas, have invented certain new and useful Improvements in Antifriction-Bearings, of which the following is a specification.

This invention relates to anti-friction bearings.

One object of the invention is to provide an anti-friction bearing embodying such characteristics that the rollers employed may have direct engagement with the bearing throughout their length and contact with the boxing at intervals, the boxing being formed to provide for and insure a positive distribution of the lubricant.

Another object of the invention resides in the provision of means for supporting the rollers in direct engagement with the journal without supporting the rollers in grooves or a frame work, the boxing and journal being so constructed that the rollers may roll freely and move bodily independently of one another or together between the journal and boxing.

With the above and other objects in view, the present invention consists in the combination and arrangement of parts hereinafter more fully described, illustrated in the accompanying drawings, and particularly pointed out in the appended claim.

In the drawings:—Figure 1 is a longitudinal sectional view of the invention illustrating its application. Fig. 2 is a longitudinal sectional view of the boxing. Fig. 3 is a transverse sectional view of the structure shown in Fig. 1.

Referring now more particularly to the accompanying drawings, the reference character 1 indicates a boxing provided with a plurality of oppositely arranged spiral bearing ribs 5 and grooves between the ribs, each set of ribs and grooves being directed from the center of the boxing toward the opposite ends thereof to provide for an even and positive distribution of the lubricant.

The character 4 indicates an axle having the periphery of its journal bearing portion perfectly smooth for direct engagement therewith throughout the entire lengths of the bearing rollers 2 upon which latter bear the aforesaid ribs 5. These rollers 2 roll around the roller bearing freely and without the employment of a frame-work or any other means other than bearings and boxing to support them and they are held against longitudinal displacement by the collars 3 secured in any suitable manner to the axle against the ends of the boxing, as clearly shown in Fig. 1.

What is claimed is:—

In an anti-friction bearing, an axle whose exterior is continuously smooth, stop collars at the terminals thereof and having flat, smooth inner faces, said collars embracing the axle, a boxing between the collars whose internal diameter is of greater cross section than the cross section of the axle and whose internal surface is provided with a plurality of oppositely arranged slightly curved spiral bearing ribs and intervening correspondingly curved grooves between the ribs, said ribs and grooves extending spirally and outwardly from a point intermediate the ends of the boxing with the outer ends of the grooves opening through the ends of the boxing and communicating with each other at their inner ends, and rollers each having a smooth peripheral surface and disposed between said axle and the ribs of said boxing and extending between said stop collars, said rollers having longitudinal play between said collars, the grooves insuring a distribution of the lubricant to the rollers and directly to the inner faces of said collars.

CHESTER A. LATHAM.

Witnesses:
 GEO. F. POND,
 G. H. POND.